(12) United States Patent
Mitchell et al.

(10) Patent No.: US 10,264,126 B2
(45) Date of Patent: *Apr. 16, 2019

(54) CONTACT CENTER SYSTEM AND METHOD FOR ADVANCED OUTBOUND COMMUNICATIONS TO A CONTACT GROUP

(71) Applicant: GENESYS TELECOMMUNICATIONS LABORATORIES, INC., Daly City, CA (US)

(72) Inventors: Theodore Wallace Mitchell, Dallas, TX (US); Christopher John Decker, Fredericksburg, VA (US); Daniel S. Stoops, Powell, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/982,539

(22) Filed: May 17, 2018

(65) Prior Publication Data

US 2018/0270353 A1  Sep. 20, 2018

Related U.S. Application Data

(63) Continuation of application No. 15/250,323, filed on Aug. 29, 2016, now Pat. No. 9,979,823.

(51) Int. Cl.
*H04M 3/00* (2006.01)
*H04M 5/00* (2006.01)
(Continued)

(52) U.S. Cl.
CPC .......... *H04M 3/5191* (2013.01); *H04L 51/14* (2013.01); *H04L 12/1895* (2013.01); *H04L 51/30* (2013.01);
(Continued)

(58) Field of Classification Search
CPC .. G10L 15/00; G06Q 10/06; G06Q 10/06316; G06Q 30/016; H04L 51/02;
(Continued)

(56) References Cited

U.S. PATENT DOCUMENTS 5,586,179 A * 12/1996 Stent ................. H04M 3/51
379/242
6,850,602 B1 * 2/2005 Chou ................. H04M 3/5158
379/80

(Continued)

FOREIGN PATENT DOCUMENTS

KR   1020050099371 A   10/2005
KR   1020100115608 A   10/2010

OTHER PUBLICATIONS

International Search Report and Written Opinion for Application No. PCT/US2017/048724, dated Nov. 30, 2017, 15 pages.

*Primary Examiner* — Khai N. Nguyen

(57) ABSTRACT

A method for managing outbound communications for a contact center includes: detecting, by a processor associated with the contact center, a trigger for transmitting outbound messages to a customer of the contact center, determining, by the processor, a notification strategy for the customer in response to the detected trigger, identifying, by the processor, a contact group designated for the customer, initiating, by the processor, first and second conversations with respectively first and second contacts in the contact group for transmitting first and second outbound communications according to the notification strategy, monitoring, by the processor, progress of the first and second conversations, and modifying, by the processor, a state of the second conversation with the second contact based on the progress of the first conversation with the first contact.

24 Claims, 8 Drawing Sheets

(51) Int. Cl.
*H04M 3/51* (2006.01)
*H04L 12/58* (2006.01)
*H04M 3/22* (2006.01)
*H04W 4/14* (2009.01)
*H04L 12/18* (2006.01)

(52) U.S. Cl.
CPC ........ *H04M 3/2281* (2013.01); *H04M 3/5158* (2013.01); *H04W 4/14* (2013.01)

(58) Field of Classification Search
CPC ....... H04L 51/046; H04L 51/24; H04L 51/30; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011; H04M 2203/2061; H04M 2242/00; H04M 2242/08; H04M 2242/12; H04M 3/2281
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | | |
|---|---|---|---|
| 8,315,370 B2* | 11/2012 | McCord | H04L 12/66 379/221.01 |
| 8,830,876 B2* | 9/2014 | Ristock | H04M 3/42127 370/260 |
| 9,979,823 B2* | 5/2018 | Mitchell | H04M 3/5191 |
| 2002/0076030 A1* | 6/2002 | Statham | H04M 3/22 379/229 |
| 2005/0002515 A1* | 1/2005 | Mewhinney | H04M 3/5158 379/266.08 |
| 2005/0187781 A1* | 8/2005 | Christensen | H04L 51/04 709/207 |
| 2007/0198329 A1* | 8/2007 | Lyerly | G06Q 10/00 705/7.16 |
| 2008/0021790 A1* | 1/2008 | Brown | G06Q 20/04 705/24 |
| 2009/0077191 A1* | 3/2009 | Bristow | H04L 51/14 709/207 |
| 2010/0189228 A1* | 7/2010 | Seyfetdinov | H04M 3/42 379/88.14 |
| 2011/0016190 A1* | 1/2011 | He | H04L 51/30 709/206 |
| 2012/0099720 A1* | 4/2012 | Soundar | H04M 3/5158 379/265.02 |
| 2012/0224682 A1* | 9/2012 | Zgardovski | G06Q 10/063112 379/266.07 |
| 2014/0067669 A1 | 3/2014 | Meeks et al. | |
| 2014/0222924 A1 | 8/2014 | Rasmussen et al. | |
| 2014/0244765 A1* | 8/2014 | Smith | H04L 51/24 709/206 |
| 2015/0012310 A1 | 1/2015 | Shen | |
| 2018/0063329 A1* | 3/2018 | Mitchell | H04M 3/5191 |

* cited by examiner

FIG. 6

CONTACT CENTER SYSTEM AND METHOD FOR ADVANCED OUTBOUND COMMUNICATIONS TO A CONTACT GROUP

CROSS-REFERENCE TO RELATED APPLICATIONS

This application is a continuation of U.S. patent application Ser. No. 15/250,323, filed on Aug. 29, 2016, now U.S. Pat. No. 9,979,823, the content of all of which are incorporated herein by reference.

FIELD

Aspects of the invention relate to the field of inbound and outbound transaction management in contact centers.

BACKGROUND

There are many situations where it might be desirable to send notifications to and receive responses from a group of individuals that are designated as contacts for a particular business. For example, an outbound campaign system may be employed to automatically send notifications to the designated individuals in order to, for example, alert the individuals of a situation. The notifications may be sent, for example, as part of an outbound campaign. The event or situation triggering the notifications may cause multiple types of notifications to be sent to the different individuals.

A conventional outbound campaign system distributes notifications across recipients and channels according to a preset campaign without regard, generally, to responses/actions that may be taken in response to the notifications. For example, in a conventional outbound campaign system, when the first recipient responds to the text message indicating acknowledgement of the notification, the second recipient who is scheduled to receive his or her own set of notifications still often receives the notifications despite the fact that the first recipient may have already received and acknowledged his or her notification. Thus, in a conventional outbound campaign system, modifications (other than, e.g., pacing) are generally not made to an ongoing campaign based on results of the campaign.

The traditional approach for outbound campaigns may present several problems. First, the outbound campaign system may send out more notifications than necessary; thus, incurring unnecessary cost. Second, as the recipients are not updated as to who has acknowledged an alert, a recipient may respond to the alert even after a different recipient has acknowledged the alert, unnecessarily using up telecommunication resources. Third, in the conventional approach, each recipient is responsible for determining if another recipient has acknowledged the notification. As a result, each recipient may have to take time to respond to the notification and also check that the condition that triggered the notification was corrected.

What is desired is a notification solution that does not rely on a traditional outbound campaign approach to transmit notifications. The notification solution should reduce overhead for a group of recipients in terms of time and effort, and should also reduce system notification costs by avoiding unnecessary notifications.

The above information disclosed in this Background section is only for enhancement of understanding of the background of the invention, and therefore it may contain information that does not form the prior art that is already known to a person of ordinary skill in the art.

SUMMARY

Aspects of embodiments of the invention are directed to a notification system capable of cascading dependent notifications whereby the delivery of an ordered set of notifications to a given recipient is based on the acknowledgement of previous notifications in the set. In some embodiments, the notification system allows a business or a customer of the business to indicate a preference as to a set of notification channels that may be used for notifications and in what order (and delay) those channels may be employed. According to some embodiments, the notification system informs all recipients that a recipient has acknowledged one of the notifications, records the acknowledgment in the system of record for future use, and makes rules-based decisions pertaining to the remaining notifications of the set of notifications based on the acknowledgment (e.g., stops the set of notifications to all of the recipients based on the acknowledgment).

According to some embodiments of the invention, there is provided a method for managing outbound communications for a contact center, the method including: detecting, by a processor associated with the contact center, a trigger for transmitting outbound messages to a customer of the contact center; determining, by the processor, a notification strategy for the customer in response to the detected trigger; identifying, by the processor, a contact group designated for the customer; initiating, by the processor, first and second conversations with respectively first and second contacts in the contact group for transmitting first and second outbound communications according to the notification strategy; monitoring, by the processor, progress of the first and second conversations; and modifying, by the processor, a state of the second conversation with the second contact based on the progress of the first conversation with the first contact.

In some embodiments, the monitoring the progress of the conversations includes monitoring for return responses to the outbound communications.

In some embodiments, the modifying the state of the second conversation includes transmitting a notification to the second contact indicative of a return response from the first contact.

According to some embodiments of the invention, there is provided a method for managing outbound communications for a customer contact center, the method including: receiving, by a processor, a notification request from an external source requesting the performance of an action by a customer; identifying, by the processor, a plurality of recipients associated with the customer; identifying, by the processor, a notification strategy associated with the customer, the notification strategy defining a plurality of conversations with the plurality of recipients that are parallel and co-dependent, each of the plurality of conversations including an ordered set of notifications separated in time and conducted across a plurality of communication channels to one of the plurality of recipients; conducting, by the processor, each one of the plurality of conversations by directing, to each one of the plurality of recipients, transmission of a corresponding ordered set of notifications according to the notification strategy; receiving, by the processor, an acknowledgment from an acknowledging recipient from among the plurality of recipients indicating the performance of the action; and in response to receiving the acknowledgment, terminating, by the processor, the plurality of conversations by ceasing remaining notifications of the plurality of conversations.

In some embodiments, the method further includes initiating, by the processor, transmission of final communications to remaining ones of the plurality of recipients indicating the performance of the action by the acknowledging recipient.

In some embodiments, the conducting of each one of the plurality of conversations includes directing concurrent transmission of a first notification of the corresponding ordered set of notifications.

In some embodiments, the conducting of each one of the plurality of conversations includes directing a cloud server to transmit the ordered set of notifications to each one of the plurality of recipients.

In some embodiments, the method further includes recording, by the processor, the acknowledgment by recording an identity of the acknowledging recipient, a time of acknowledgment, and a communication channel of the plurality of communication channels by which the acknowledgment was made.

In some embodiments, the notification strategy further defines a timing schedule for sending each one of the ordered set of notifications.

In some embodiments, the method further includes formulating the notification strategy based on notification rules and a timing schedule received from the external source.

In some embodiments, the plurality of communication channels includes email, telephony channels, short message service.

In some embodiments, each notification of the ordered set of notifications includes a message requesting the performance of the action.

In some embodiments, the action includes removing a blocked bin.

According to some embodiments of the invention, there is provided a system for managing outbound communications for a customer contact center, the system including: a processor; and memory storing instructions that, when executed on the processor, cause the processor to perform: receiving a notification request from an external source requesting the performance of an action by a customer; identifying a plurality of recipients associated with the customer; identifying a notification strategy associated with the customer, the notification strategy defining a plurality of conversations with the plurality of recipients that are parallel and co-dependent, each of the plurality of conversations including an ordered set of notifications separated in time and conducted across a plurality of communication channels to one of the plurality of recipients; conducting each one of the plurality of conversations by directing, to each one of the plurality of recipients, transmission of a corresponding ordered set of notifications according to the notification strategy; receiving an acknowledgment from an acknowledging recipient from among the plurality of recipients indicating the performance of the action; and in response to receiving the acknowledgment, terminating the plurality of conversations by ceasing remaining notifications of the plurality of conversations.

In some embodiments, the memory further stores instructions that, when executed on the processor, cause the processor to perform initiating transmission of final communications to remaining ones of the plurality of recipients indicating the performance of the action by the acknowledging recipient.

In some embodiments, the conducting of each one of the plurality of conversations includes directing concurrent transmission of a first notification of the corresponding ordered set of notifications.

In some embodiments, the conducting of each one of the plurality of conversations includes directing a cloud server to transmit the ordered set of notifications to each one of the plurality of recipients.

In some embodiments, the memory further stores instructions that, when executed on the processor, cause the processor to perform recording the acknowledgment by recording an identity of the acknowledging recipient, a time of acknowledgment, and a communication channel of the plurality of communication channels by which the acknowledgment was made.

In some embodiments, the notification strategy further defines a timing schedule for sending each one of the ordered set of notifications.

In some embodiments, the memory further stores instructions that, when executed on the processor, cause the processor to perform formulating the notification strategy based on notification rules and a timing schedule received from the external source.

In some embodiments, the plurality of communication channels includes email, telephony, and short message service.

In some embodiments, each notification of the ordered set of notifications includes a message requesting the performance of the action.

According to some embodiments of the invention, there is provided a system for managing outbound communications for a customer contact center, the system including: means for receiving a notification request from an external source requesting the performance of an action by a customer; means for identifying a plurality of recipients associated with the customer; means for identifying a notification strategy associated with the customer, the notification strategy defining a plurality of conversations with the plurality of recipients that are parallel and co-dependent, each of the plurality of conversations including an ordered set of notifications separated in time and conducted across a plurality of communication channels to one of the plurality of recipients; means for conducting each one of the plurality of conversations by directing, to each one of the plurality of recipients, transmission of a corresponding ordered set of notifications according to the notification strategy; means for receiving an acknowledgment from an acknowledging recipient from among the plurality of recipients indicating the performance of the action; and means for terminating the plurality of conversations by ceasing remaining notifications of the plurality of conversations, in response to receiving the acknowledgment.

BRIEF DESCRIPTION OF THE DRAWINGS

The accompanying drawings, together with the specification, illustrate example embodiments of the invention, and, together with the description, serve to explain the principles of the invention.

FIG. 6 is a photograph of a graphical user interface for defining a set of rules utilized by a rules engine, according to some embodiments of the invention.

DETAILED DESCRIPTION

Figure 1:
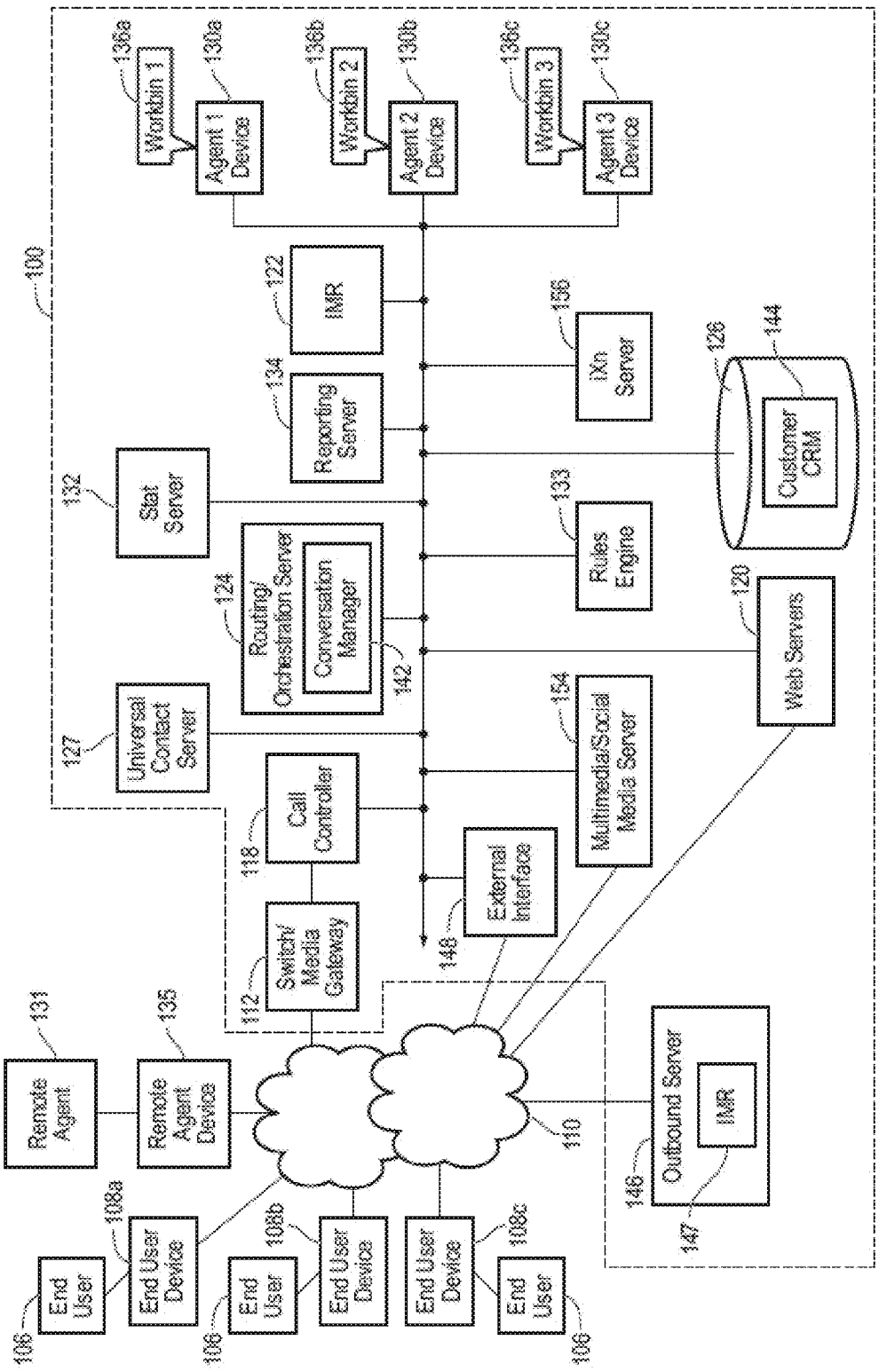
FIG. 1 is a schematic block diagram of a system for supporting a contact center in providing contact center services, according to some exemplary embodiments of the invention.

In the following detailed description, only certain exemplary embodiments of the invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

In general terms, embodiments of the invention are directed to a system and method that provides efficient notification, from an enterprise to a plurality of recipients across a plurality of channels, with the aim of receiving acknowledgment of performance of an action by at least one of the recipients and then notification of that acknowledgement to the other recipients. The system and method, according to some embodiments, achieves this aim while reducing time and effort overhead for recipients and reducing system notification costs.

According to some embodiments, the notifications are caused to be transmitted from a customer contact center supporting the enterprise, to a customer of the enterprise. The customer may be a business or organization that has various individuals designated, as a group, as the contact for the business or organization. The alerts or notifications (collectively referred to as notifications) may be transmitted as outbound messages to the various individuals. The outbound messages/notifications to the contact group may be triggered, for example, based on detecting a situation that calls for attention by the customer. The contact center may monitor the notifications for return responses or actions, and further notifications may be triggered or not, in response to the detected responses/actions. Details on the return responses/actions may be stored in a database record for the customer. Reference may be made to stored details of the return responses/actions when a communication is received at the customer contact center that is related to the situation that triggered the notifications.

Various representative use cases help illustrate the embodiments of the invention. In a first use case, a driver of a garbage truck working for a waste disposal company may notice that access to a customer's bin is blocked by an object or vehicle. The driver may call the waste disposal company to report the obstruction via telephony communication, or may invoke an application on a mobile device to transmit a message over a data communications network. A contact center supporting the waste disposal company receives the message reporting the obstruction. One or more servers and/or databases at the contact center are invoked to identify the customer account associated with the bin, identify a contact group designated for the customer account, and communicate with an outbound server to send notifications (e.g., alerts) to be sent to the pre-designated recipients in the contact group (e.g., customer contacts) to remove the obstruction (the "action").

The outbound server delivers to each recipient an ordered set of notifications as outbound messages through various communication channels. For example, the outbound server may send a text message, which is followed up by a phone call, and then further followed up by an email. Once a recipient acknowledges (e.g., responds to) any one of the notifications, a rules-based decision may be made on whether or not to cease further notifications. For example, the acknowledgment by a recipient may cause further notifications to that recipient and other designated recipients to be ceased. Further, a weighted value may be assigned to the acknowledgment/acceptance of each recipient (e.g., based on compliance/follow-through confidence levels associated with each recipient) and not cease further notifications until an aggregate value of weighted value of the acknowledging recipient(s) is above a preset threshold. In some embodiments, the rules-based decision making may involve machine learning based on historical interaction data (e.g., based on a recipients track record of following through with performance of the requested action after the recipient's acknowledgments/acceptance). In addition, the other designated recipients (or a quorum subset of the designated recipients) in the contact group are informed of the acknowledgment of the notification. In this manner, the outbound server refrains from sending additional, unnecessary notifications to the other designated recipients who may not respond to the initial notification. Also, each recipient does not have the responsibility of determining whether someone else has already responded to the notifications.

In a second use case, a mail courier working for a delivery company who is tasked with delivery of a package which requires a delivery confirmation signature, may find that no one is present at the address to sign for the package. The driver may report the absence to a customer contact center supporting the delivery company using, for example, a mobile device. The customer contact center receives the message and invokes one or more severs and/or databases to identify the customer account associated with the delivery address, identify a contact group designated for the customer account, and communicate with an outbound server to send notifications (e.g., alerts) to predetermined recipients in the contact group (e.g., tenants of the property) requesting their presence at the address or requesting a rescheduling of the delivery. Similar to the first use case, the outbound server may deliver to each recipient an ordered set of notifications through various channels. Once a recipient responds to any one of the notifications, further notifications to the designated recipients may be stopped, and the other designated recipients may be informed of the response to the notification.

In a third use case, an alarm company may have a contact group that is to be contacted when an alarm at a customer site is triggered. Upon detecting the alarm, the customer contact center of the alarm company invokes one or more severs and/or databases to identify the customer account associated with the address where the alarm was triggered. A contact group designated for the customer account is identified, and alerts are sent to the predetermined recipients in the contact group to determine whether the alarm was triggered by accident. As in the other use cases, the contact center may work with an outbound server to trigger transmission of an ordered set of notifications to the recipients through various communication channels. Once a recipient responds to any one of the notifications, further notifications to the designated recipients may be stopped, and the other designated recipients may be informed of the response to the notification.

FIG. 1 is a schematic block diagram of a system for supporting a contact center in providing contact center services, according to some exemplary embodiments of the invention. The contact center may be an in-house facility of a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system 100 are hosted at the contact center premises and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system 100 may also be distributed across various geographic locations and computing environments and not necessarily contained in a single location, computing environment, or even computing device.

According to one example embodiment, the contact center system 100 manages resources (e.g., personnel, computers, and telecommunications equipment) to enable delivery of services via telephone or other communication mechanisms. Such services may vary depending on the type of contact center, and may range from customer service to help desk, emergency response, telemarketing, order taking, and the like. According to some embodiments, advanced notification services are provided by the customer contact center system 100 on agreements with its customers.

Customers, potential customers, or other end users (collectively referred to as customers or end users, e.g., end users 106) desiring to receive services from the contact center may initiate inbound communications (e.g., telephony calls) to the contact center via their end user devices 108a-108c (collectively referred to as end user devices 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multimedia transactions.

Inbound and outbound communications from and to the end user devices 108 may traverse a telephone, cellular, and/or data communications network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but not limited to 3G, 4G, LTE, and the like.

According to one example embodiment, the contact center system 100 includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch/media gateway 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway 112 establishes a voice path/connection (not shown) between the calling customer and the agent telephony device, by establishing, for example, a connection between the customer's telephony device and the agent telephony device.

According to some exemplary embodiments of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In some embodiments, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to some exemplary embodiments of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open-ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the communication server 122 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

According to some embodiments, the routing server 124 includes a conversation manager 142 for maintaining context or state of interactions processed by the routing server. The conversation manager 142 is configured to apply rules based on the context to provide to the routing server a next action to be taken in processing the interaction. In this regard, the conversation manager 142 queries a rules engine 133 storing rules for the contact center in selecting an action to be taken in processing the interaction. According to some embodiments, the rules engine 133 is configured to apply one or more business rules based on input data, and provide a result or solution in response. In some embodiments, for each customer account of the business (e.g., the waste management company), the rules may indicate a plurality of recipients (e.g., designated customer contacts). The rules may further specify an ordered set of notifications for each recipient, which may include a text message, a telephone call, and an email, in that order. The rules may also indicate a time delay after which a non-response to or lack of acknowledgment of one of the ordered set of notifications will trigger the sending of a subsequent notification in the ordered set of notifications. In some embodiments, each notification in the ordered set of notifications may have an associated time delay.

In some embodiments, the conversation manager 142 may also query a customer database, which stores information about existing clients, such as contact information, service level agreement (SLA) requirements, the nature of previous customer contacts and the actions taken by the contact center to resolve any customer issues, and the like. The customer database may also store information on responses/actions taken by recipients of notifications, and the stored information may be provided to a contact center agent for reference when dealing with another communication relating to the issue for which the notifications were transmitted. The database may be, for example, Cassandra or any NoSQL database, and may be stored in a mass storage device 126. The database may also be an SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referred to as agent device 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system 100 may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multimedia events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system 100, the web servers may also be provided by third parties and/or maintained outside of the contact center premises. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real-time communication (WebRTC), or the like.

According to some exemplary embodiments of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real-time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referred to as workbin 136) as a task to be completed by the agent. The agent's workbin may be implemented via any data structure conventional in the art, such as, for example, a linked list, array, and/or the like. The workbin 136 may be maintained, for example, in a buffer memory of each agent device 130.

According to some exemplary embodiments of the invention, the mass storage device(s) 126 may store one or more databases relating to agent data (e.g., agent profiles, schedules, etc.), customer data (e.g., customer profiles), interaction data (e.g., details of each interaction with a customer, including reason for the interaction, disposition data, time on hold, handle time, etc.), and the like. According to some embodiments, some of the data (e.g., customer profile data) may be maintained in a customer relations management (CRM) database 144 hosted in the mass storage device 126 or elsewhere. The mass storage device may take the form of a hard disk or disk array as is conventional in the art.

According to some embodiments, the contact center system 100 may include a universal contact server (UCS) 127, configured to retrieve information stored in the CRM database and direct information to be stored in the CRM database. The UCS 127 may also be configured to facilitate maintaining a history of customer preferences and interaction history, and to capture and store data regarding comments from agents, customer communication history, and the like.

The contact center system 100 may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g., an agent/administrator, contact center application, and/or the like).

The orchestration server 124 may send notifications to the end user 106 via an outbound server 146, which in some embodiments, is implemented on the cloud (i.e., a network of servers operating on the internet), either fully or partially (e.g., as a hybrid solution). In such embodiments, the orchestration server 124 is associated with and in communication with the contact center (e.g., via the external interface 148) to notify about status and trigger actions. However, embodiments of the invention are not limited thereto, and the outbound server 146, for example, may be implemented within the contact center system 100. In some embodiments, the outbound server 146 may include an interactive media response (IMR) server 147, which may be similar to the IMR 122 and may output the notifications received from the orchestration server 124 to the end user 108 and prompt the end users 108 for a response. For example, when a notification is an outbound voice call, and the receiving end user 108 answers the call, the IMR server 147 may deliver an audio message to the recipient and provide the recipient with a menu of options for response. The IMR server 147 may be configured to interpret a keyed response, and, in some embodiments, may also be configured to recognize and process human speech. The outbound server 124 may further return a recipient's response (e.g., acceptance/acknowledgment) back to the orchestration server 124.

According to some embodiments, orchestration server 124 may receive a request or alert from a remote agent 131 who may be associated with an enterprise serviced by the contact center. The remote agent 131 may initiate inbound communications to the contact center via his/her remote agent device 135. The remote agent device 135 may be a communication device conventional in the art, such as, for example, a telephone, wireless phone, smart phone, personal computer, electronic tablet, and/or the like, and may host an application that is configured to communicate with the contact center (e.g., the orchestration server 124) over the data communications network 110.

In some embodiments, communications between the orchestration server 124 and the remote agent device 135 may be facilitated by the external interface 148. In embodiments in which the outbound server 146 is implemented on the cloud, the external interface 148 may further facilitate communications between the orchestration server 124 and the outbound server 146. For example, the orchestration may send a signal through the external interface 148 to direct the outbound server 146 to send outbound notifications to the end user devices 108. Additionally, any user response received by the outbound server 146 may be forwarded to the orchestration server 124 via the external interface 148.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably (in the context of contact center relations with the business/organization and the customer (e.g., recipients)), and generally refer to any real-time and non-real-time interaction that uses any communication channel including, without limitation, telephony calls (PSTN or VoIP calls), emails, vmails (voice mail through email), video, chat, screen-sharing, text messages, social media messages, web real-time communication (e.g., WebRTC calls), and the like.

According to some embodiments of the invention, the contact center system 100 orchestrates the transmitting of advanced notifications and monitors for return responses/actions, to trigger further notifications, or not, depending on the types of responses/actions received. The advanced notifications transmitted by the contact center system 100 may include, for example, cascading parallel and dependent notifications to multiple recipients, cross-recipient dependent notifications across multiple channels, and post-acceptance notifications. According to some embodiments, cascading dependent notifications refer to an ordered set of notifications that are sent to each recipient, where the transmitting of a later notification in the ordered set depends on whether an acknowledgement was received to an earlier notification in the set. For example, if the ordered set of notifications for a particular recipient is text message, followed by a phone call, and further followed by an email, and the recipient acknowledges the phone call notification, the email notification is not sent.

According to some embodiments, cross-recipient dependent notifications refer to ordered notifications sent to two or more recipients in a contact group, where in response to sending initial notifications to the recipients and receiving an acknowledgment from one of the recipients, remaining notifications to the remaining recipients are not transmitted. For example, if recipients A and B receive the initial notifications, and recipient A acknowledges the notification prior to the full set of notification being completely delivered to recipient B, then all remaining notifications to recipient B are not sent.

According to some embodiments, post-acceptance notifications refer to ordered notifications sent to two or more recipients in a contact group, where in response to sending initial notifications to the recipients and receiving an acknowledgment from one of the recipients, a follow-up notification is transmitted to the remaining recipients identifying the recipient that responded to the notification. Such a follow-up notification, in effect, informs the other recipients that they can "stand down" in regards to the notifications that they have received.

Referring again to the use case of notifications sent by a waste disposal company (WDC), the company may have a policy of notifying customers to unblock their waste bin if the bin is blocked. A given WDC customer account may have associated with it a contact group to whom such notifications are to be sent. The contact group may identify, for example multiple individuals, and associated communication channels to unblock a waste bin. For the sake of simplicity, in the examples of FIGS. 2-4, it is assumed that a WDC customer account designates a first recipient R1 and a second recipient R2 as individuals that may be notified by the contact center to clear the path to the bin. However, embodiments of the invention are not limited thereto, and any suitable number of recipients may be designated.

Figure 2:
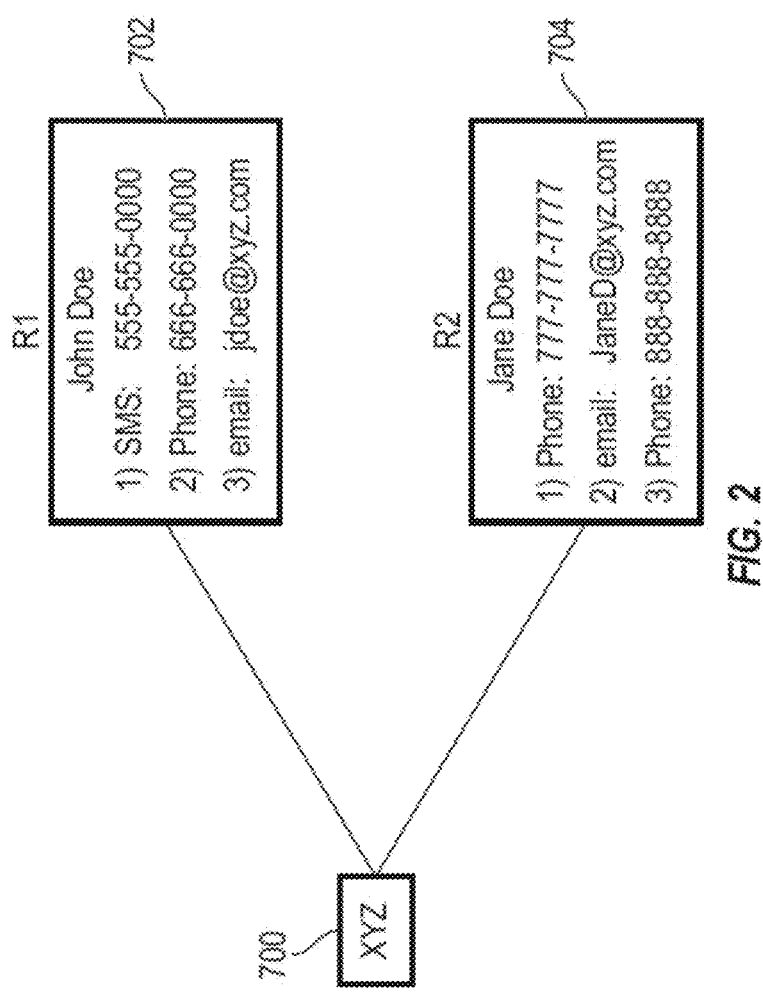
FIG. 2 is a schematic layout diagram of exemplary contact records making up a contact group for a particular customer of the contact center, according to some exemplary embodiments of the invention.

FIG. 2 is a schematic layout diagram of exemplary contact records 702, 704 making up a contact group for a particular customer 700 of the contact center, according to some exemplary embodiments of the invention.

Referring to FIG. 2, the contact records 702 and 704 may be respectively associated with the recipients R1 and R2, which may form the contact group for the customer 700 (e.g., the WMC). The contact records 702 and 704 may indicate contact information of the associated recipients across a plurality of communication channels (e.g., email, telephony channels, short message service (SMS), and/or the like). The contact records 702 and 704 may further indicate the order in which the associated recipient is to receive notifications through the plurality of communication channels (which may express recipient preferences or be preset by, for example, the business or a business analyst). For example, the contact records 702 may indicate that a first notification is to be transmitted to the first recipient via SMS, a second notification via a telephony channel, and a third notification via email.

According to some embodiments, the UCS 127 may maintain the contact records 700 and 702 of the notification recipients R1 and R2. The actual contacts records may be stored at the CRM database 144. In some embodiments, the contact records may form the basis of the notification strategy.

Figure 3:
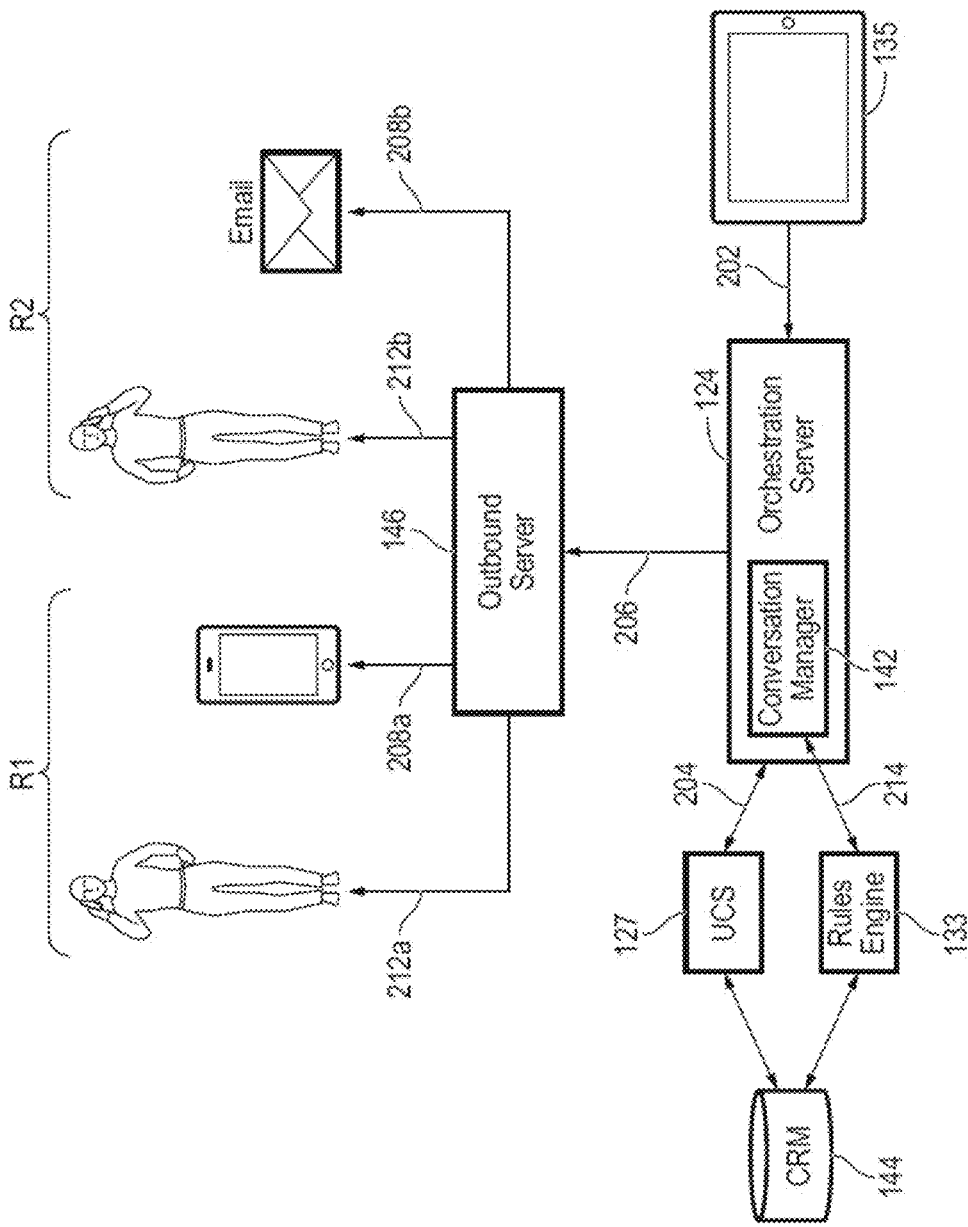
FIG. 3 is a block diagram of various components associated with the contact center system of FIG. 1 for managing advanced notifications to a contact group, according to some exemplary embodiments of the invention.

FIG. 3 is a block diagram of various components associated with the contact center system 100 of FIG. 1 for managing advanced notifications to a contact group, according to some exemplary embodiments of the invention.

Referring to FIG. 3, the orchestration server 124 may receive information on a request from a business/customer, remote agent device 135, or other device (collectively referred to as an external source) to initiate the advanced notification process. The notification may be, for example, to convey a business message. The request may also be internally generated by one or more servers of the contact center, for example, based on rules executed on behalf of the customer. In an example, the request may be prompted by a driver of a waste collection vehicle (the remote agent 131) who encounters a blocked bin. The driver may activate the request using the remote agent device 135 (e.g., a mobile device), and transmit the request over link 202. According to some embodiments, the device 135 may host an application that is configured to communicate with the external interface 148 over the data communications network 110. The request may include a customer ID identifying a customer of the business to which the notifications are to be sent. For example, the request may identify a restaurant that is the owner of the blocked bin. In some examples, GPS coordinates of the blocked bin, the route schedule of the waste collection vehicle, and/or the like, may aid in determining the customer ID.

According to some embodiments, the CRM database 142 generates a case record for the outcomes in response to the request. The orchestration server 124 transmits (e.g., via the conversation manager 142) a message over link 204 to direct the UCS 127 to retrieve contact records (e.g. records 700, 702) of the notification recipients (e.g., recipients R1 and R2), who are associated with the customer ID, from the CRM database 144. In an example, recipient R1 may be the restaurant manager, and recipient R2 may be the restaurant owner.

The orchestration server 124 may invoke the conversation manager 142 to further direct the rules engine 133, over link 214, to identify a notification strategy associated with that type of customer and or event. The notification strategy may include parallel and co-dependent conversations (e.g., dialogues or notification threads) with the notification recipients. Each conversation with a recipient may include an ordered set of notifications that may be sent at predefined time intervals and through predefined communication channels as specified in the retrieved customer records. For example, the rules engine 133 may define a first conversation with recipient R1 to include a text message over link 208a, followed up with a phone call over link 212a, and may define a second conversation with the recipient R2 to include a phone call over link 212b, followed up with an email over link 208b. For each notification, the rules may include a timing schedule that indicates a period of time after which the notification may be followed up with a subsequent notification in the conversation if no response or acknowledgment is received from the associated recipient. For example, the rules (e.g., the timing schedule) may indicate calling recipient R1 if more than 2 minutes has passed from the time of the initial text message notification to recipient R1.

While in the embodiments above, the notification rules that form the basis of the notification strategy are stored locally (e.g., at the mass storage device 126), embodiments of the invention are not limited thereto, and the notification rules may be provided by a back office server at the business using a predefined format (and, e.g., as part of the initial business request).

Execution of the rules by the orchestration server 124 may invoke transmission of a message over link 206 directed to the outbound server 146 (e.g., over the Internet if the outbound server 146 is a cloud server) to initiate the predefined strategies with the identified recipients by issuing (e.g., sending out) a first notification in each conversation to its corresponding recipient. The message may also identify the content of the business message that is to be included in the notifications. Such business message may also be identified by the notification strategy, and may correspond to the request received from the agent device 135. In some exemplary embodiments, the orchestration server 124 may direct the outbound server 146 to send a text message over link 208a to recipient R1, and a call over link 208b to recipient R2, with the content of the business message. The outbound server 146 may transmit the first notification of all conversations concurrently (e.g., simultaneously), or the transmissions may be delayed according to a preset order as defined by the notification strategy. For example the text message and the call may be initiated concurrently (e.g., simultaneously), or one after the other.

The notifications may convey the business message to the recipients and request an acknowledgment or a response from the recipients. For example, the business message to recipient R1/R2 may indicate that the waste bin at the restaurant is blocked, and request that the obstruction be removed. The business message may report, for example, the time, date, and location of the obstruction (via a text or voice message), and in the case of an email or text message, may even include a picture of the blocked bin captured by the driver of the waste collection vehicle. The business message may further request that the recipient R1/R2 acknowledge the notification (e.g., confirm compliance or intent to comply) by sending a reply message. For example, when the notification is in the form of a text message or email, the recipient R1/R2 may respond by sending a reply text message or reply email stating "Done", "Will be removed", and/or another predefined message. In some embodiments, the outbound server 146 may itself include an interactive media response (IMR) server 147, which may output the notifications and prompt the recipients for a response. For example, when a notification is an outbound voice call, and the associated recipient answers the call, the IMR server 147 may deliver an audio message to the recipient (e.g., "your bin is blocked" or a similar message), and provide the recipient with a menu of options for response (e.g., "press 1" to agree to removing the obstruction, "press 2" to indicate inability to remove the obstruction, and/or the like). In addition to interpreting a keyed response, the IMR server 147 may be configured to recognize human speech and may be able to understand a verbal response made by the recipient. The outbound server 146 may then forward any recipient response to the orchestration server 124 over, for example, the Internet. Thus, unlike traditional outbound systems that do not monitor for feedback of results to an outbound campaign, the outbound server 146 in the embodiments of the present invention monitor for results of an outbound communication and forward such results back to the contact center system 100 for storing and/or appropriate follow-up in response to the results.

The passage of a set period of time in the absence of a response from any of the recipients may trigger, as determined by the notification strategy, issuance of a cascading dependent notification to one or more recipients over the link 206. For example, if recipient R1 fails to respond to the initial text message notification within 2 minutes, the orchestration server 124 may instruct the outbound server 146 to place an outbound call to recipient R1. As per the notification strategy, the orchestration server 124 may further instruct the outbound server 146 to send an outbound email the recipient R2. As discussed, the notifications may be sent concurrently, or one after the other, as defined by the notification strategy.

While one or more conversations with one or more recipients are ongoing, if a recipient acknowledges or responds to a notification, the acknowledgment information is forwarded by the outbound server 146 to the orchestration server 124 over the link 206. The orchestration server 124 may record the acceptance/acknowledgment of the notification in the CRM database 144. In so doing, the orchestration server 124 may prompt the UCS 127 to record, for example, the identity of the acknowledging recipient, the time of acceptance/acknowledgment, the communication channel of the accepted/acknowledged notification, and/or the like.

Acceptance/acknowledgment of the notification may prompt the orchestration server 124 to terminate all ongoing conversations, and further close the case. Thus, if recipient R1/R2 acknowledges a notification prior to the full set of notifications being completely delivered to either of the recipients R1 or R2, then all remaining notifications to recipients R1 and R2 may not be sent. As such, the notification process adopts an approach of cross-recipient dependent conversations where recipients are given an ordered set of notifications that are delivered based on the acknowledgement by any of the recipients. Thus, by not sending out unnecessary notifications, such an approach improves communication efficiency and lowers communication costs to the business.

Further, in response to the acceptance/acknowledgment of the notification, the orchestration server 124 may instruct the outbound server 146, over link 206, to notify all other recipients (i.e., all recipients except the acknowledging recipient) of the acceptance/acknowledgment of the notification, in a final communication, via appropriate communication channels as defined by the notification strategy. In response, the outbound server 146 places an outgoing post-acceptance notification to all recipients except the accepting/acknowledging recipient, conveying which recipient has acknowledged the alert. This, in effect, tells the other recipients that they can "stand down" with regard to the notifications that they have received, and relieves each recipient of the responsibility of determining whether anyone else has already responded to the notifications. In addition, the orchestration server 124 may transmit a message to the remote agent device 135 initially transmitting the request for notification, with information on results of the outbound notifications.

Throughout the notification process, the conversation manager 142 may maintain a record of the state of notification, such as when and what notification was sent to each recipient and whether or not any recipient has accepted/acknowledged any notification. For example, a starting state of a particular conversation with a recipient may be "notification sent," with details on the notification that was sent. The conversation state for the particular conversation may then proceed to a "response received" state when a return response is received from the recipient, and end with a "resolved" state which may end the conversation with the recipient. According to some embodiments, receipt of a response/acknowledgment in one conversation triggers a change of state in the conversation with the other recipients. For example, the conversation of the other recipients may proceed to a post-notification state that triggers transmission of a notification for informing that other recipients that they may ignore the notifications as another recipient has responded to the notifications. In this regard, the conversation manager 142 keeps track of the association of the various conversations as relating to a single customer (e.g., a single customer ID) for allowing the cross-recipient dependent notifications amongst the recipients. In effect, the conversation manager 142 keeps track of communications between the contact center and a group (of recipients) as a whole.

At the end of the notification process or after every notification/response, the UCS 127 updates the CRM database (e.g., waste management (WM) CRM) stored on the mass storage device 126 with the notification history. This history may aid in establishing the context of any future interaction with the customer and/or the notification recipients.

According to some examples, the outbound server 146 may not immediately stop all conversations with recipients after receiving a first response, and may await the receipt of further acknowledgments by one or more recipients. For example, the conversation strategy may assign confidence levels to each recipient, which may indicate the likelihood of the recipient actually following through with the performance of the action (e.g., removing an obstruction from in front of a bin) after accepting/acknowledging a notification. In such examples, an acknowledgment from someone with a high confidence level may be given a higher priority than that of a recipient with a low level of confidence. As such, after receiving an acknowledgment from a recipient having a confidence level below a preset threshold, the notification may delay sending out a final communication notifying all recipients of the acknowledgment by a preset time to see if a recipient with a confidence level above the preset threshold acknowledges one of the notifications. The system may then notify all other recipients of the latter (higher confidence) acknowledgment, rather than the former (lower confidence) acknowledgment. The confidence levels of each recipient may be based on historical interaction data relating to the recipient and be defined by the business. In some embodiments, the conversations may not be ceased until the aggregate confidence level of the accepting/acknowledging recipient(s) is above a threshold, which may be user defined or dynamically set via a machine learning algorithm based on historical interaction data.

According to some embodiments, once the orchestration server 124 decides to cease further notifications to the designated recipients, the orchestration server 124 also alerts the business (e.g., the back office server at the business) that the request has been acknowledged. This may prompt the business to take a business action related to the request. For example, in the case of waste management, once the business is informed that a bin obstruction has been removed, the business may direct a waste truck driver, who may be in the near vicinity of the bin, to pick up the waste at the bin.

Figure 4:
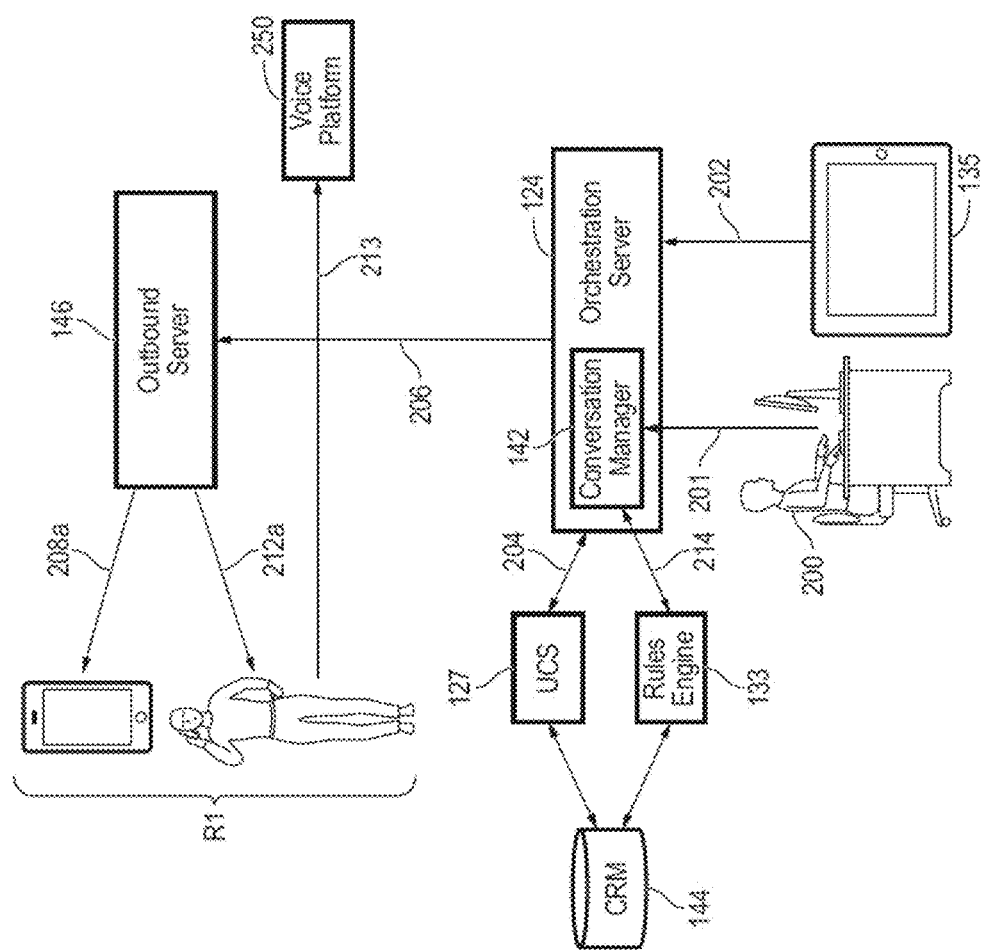
FIG. 4 is a block diagram of various components associated with the contact center system of FIG. 1 for managing advanced notifications to a contact group, including a voice dialogue with a recipient, according to some exemplary embodiments of the invention.

FIG. 4 is a block diagram of various components associated with the contact center system 100 of FIG. 1 for managing advanced notifications to a contact group, including a voice dialogue with a recipient, according to some exemplary embodiments of the invention. For the sake of simplicity, some of the processes that are described above with respect to FIG. 3 may not be repeated in the description that follows.

Referring to FIG. 4, a business analyst (e.g., a WDC business analyst) 200 may configure (e.g., sets up), via link 201, the notification rules that form the basis of the notification strategy (this is described further below with reference to FIG. 6). The rules are stored locally within the rules engine 133.

As described above with respect to FIG. 3, in response to receiving a request from an external source (e.g., a business/customer, remote agent device 135, or other device), the orchestration server 124 may orchestrate/manage a number of conversations with the notification recipients, including recipient R1. In some examples, when the recipient R1 does not respond to an initial notification, such a text message, the orchestration server 124 may call on the outbound server 146 to place an outgoing call to recipient R1. At this point, recipient R1 may answer the telephone call and hear an automated message informing him of the blocked bin. In one instance, the recipient R1 may choose to respond at that time by, for example, keying in a response or speaking a response, which may be recognized by the IMR server 147 of the outbound server 146. In another instance, the recipient R1 may later call the contact center to acknowledge the notification and/or to reschedule another waste pickup by the WDC. In some examples, the notification that triggered the recipient's call may include a telephone number that the recipient R1 may later use to call the contact center.

When calling the contact center the recipient R1 may connect, over link 213, with the contact center's voice platform 250, which may engage many of the resources at the contact center and draw upon the notification history ("context") that is maintained by the UCS 127 and/or the conversation manager 142. When the call is received at the switch/media gateway 112, the call controller 118 may engage the routing server 124 in properly routing the incoming call. The routing/orchestration server 124 may direct the IMR server 122 to determine a suitable script for querying the notification recipient R1 on his/her needs. The IMR server 122 may use the notification history maintained at the CRM database 144 and/or the conversation manager 142 to determine, for example, that the recipient R1 may be calling the WMC about the blocked bin. Then, the recipient R1 may be greeted with an interceptor message that conveys the context of the call. For example, the recipient R1 may hear, "Thank you for calling Waste Management. It appears you may be calling about your blocked bin. If that is correct, please press 1". After the recipient R1 presses '1', the IMR server 122 may, for example, direct the recipient to a live agent or an automated menu to service the recipient's need (e.g., rescheduling waste pickup).

A live agent may be able to access the notification history of the customer associated with the recipient R1 using an application running on the agent device 130.

Figure 5A:
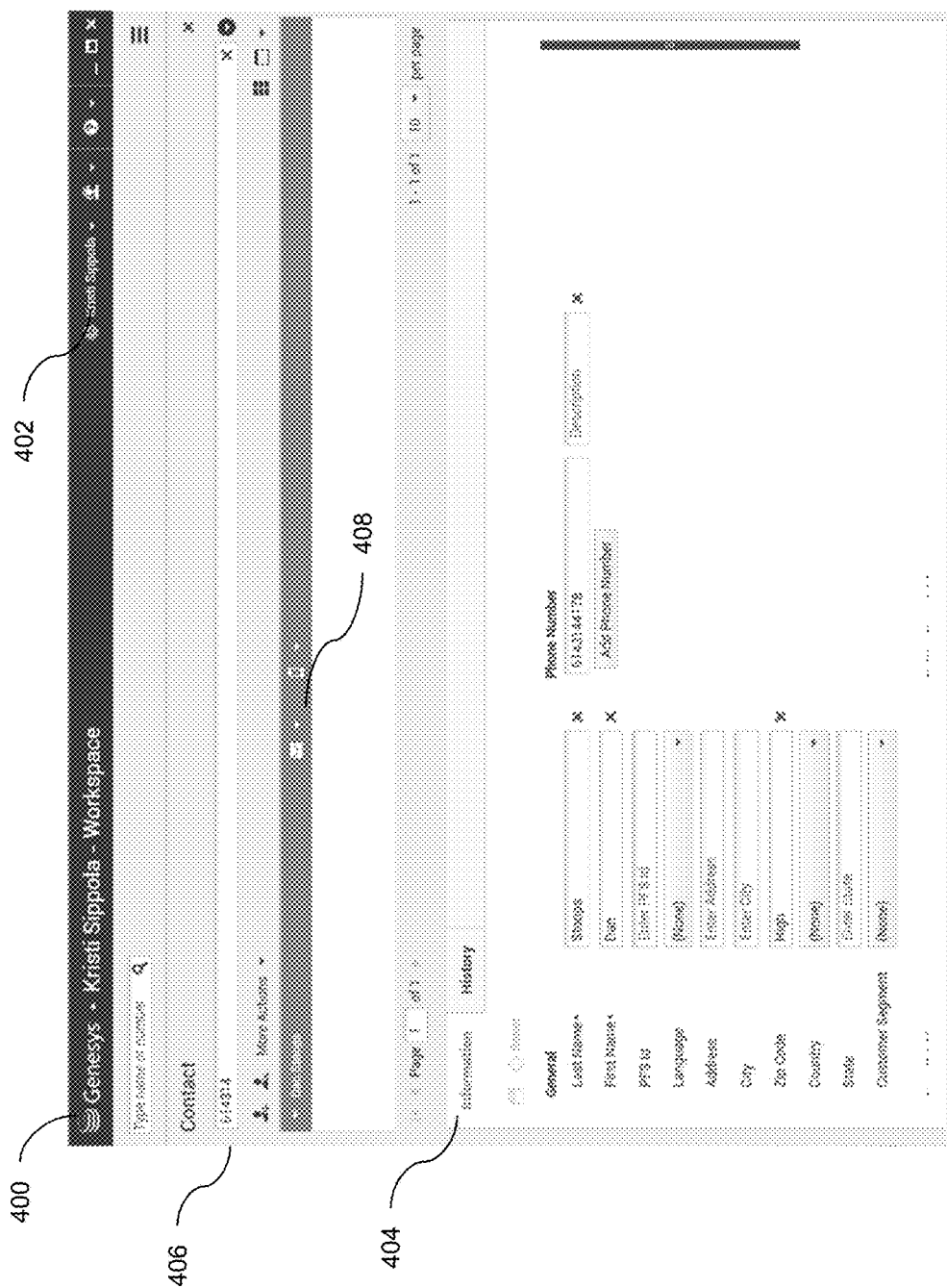
FIGS. 5A-5B are photographs of a graphical user interface for viewing a notification history maintained by a universal contact server, according to some embodiments of the invention.
Figure 5B:
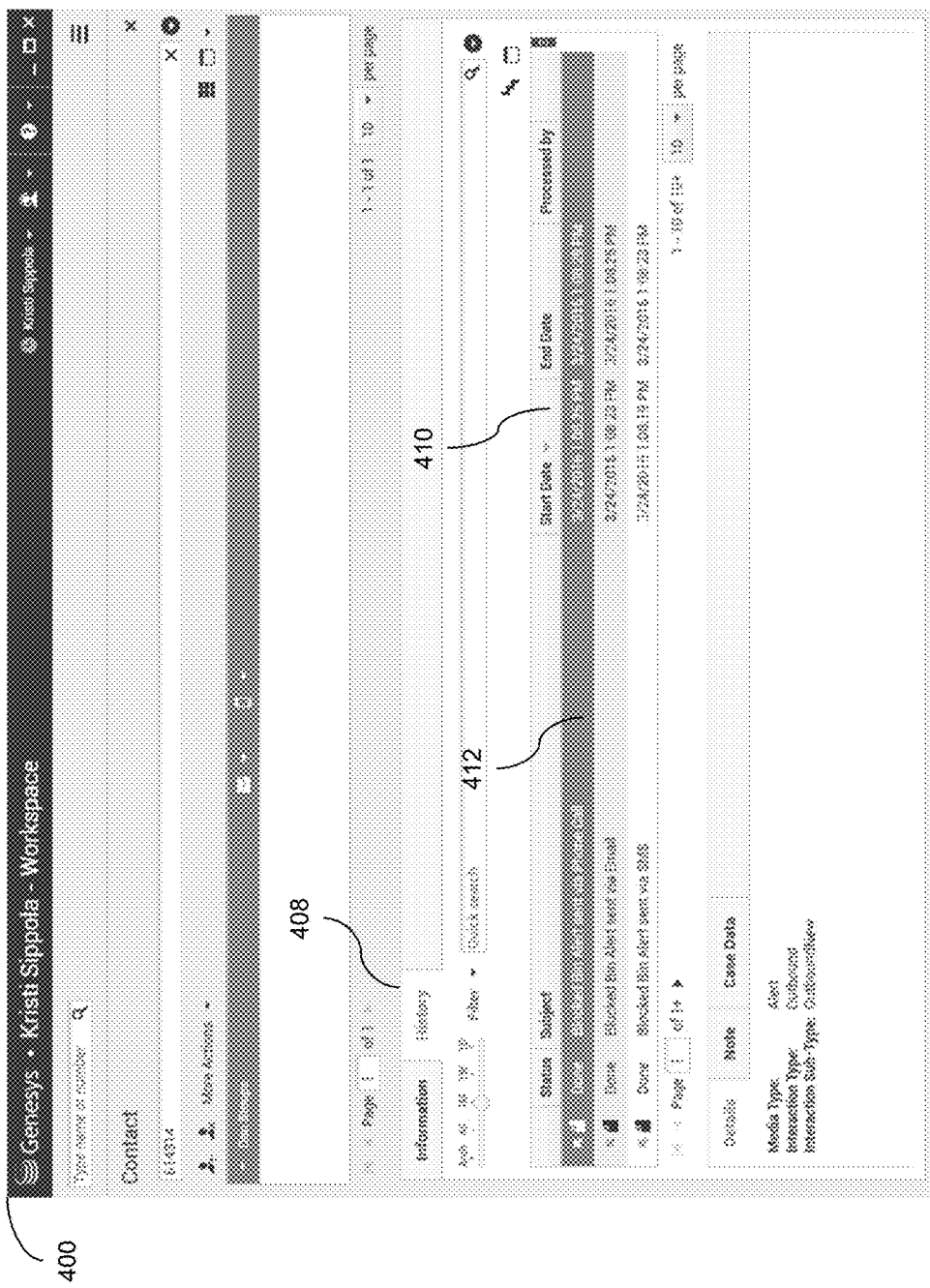

FIGS. 5A and 5B are photographs of a graphical user interface (GUI) 400 for viewing the notification history maintained by the UCS 127, according to some embodiments of the invention.

As illustrated in FIG. 5A, the GUI 400 may show the live agent 402 identifying information 404 of the notification recipient who has called the contact center as well as the customer ID 406 associated with the recipient. The GUI 400 may further show the communication channels 408 (e.g., email, phone call, and text message) used to send notifications to the recipient.

As illustrated in FIG. 5B, the GUI 400 may also show the notification history 408 pertaining to the recipient (i.e., the history of conversation with the recipient), which may include details about each notification within the conversation, such as the date and time 410 of the notification, the type and communication channel 412 of the notification (e.g., "Blocked Bin Alert sent via Phone Call"), and/or the like.

While not illustrated in FIGS. 5A and 5B, the GUI 400 may show not only the conversation history of the calling recipient, but also all of the recipients associated with the customer ID 406.

Figure 6:
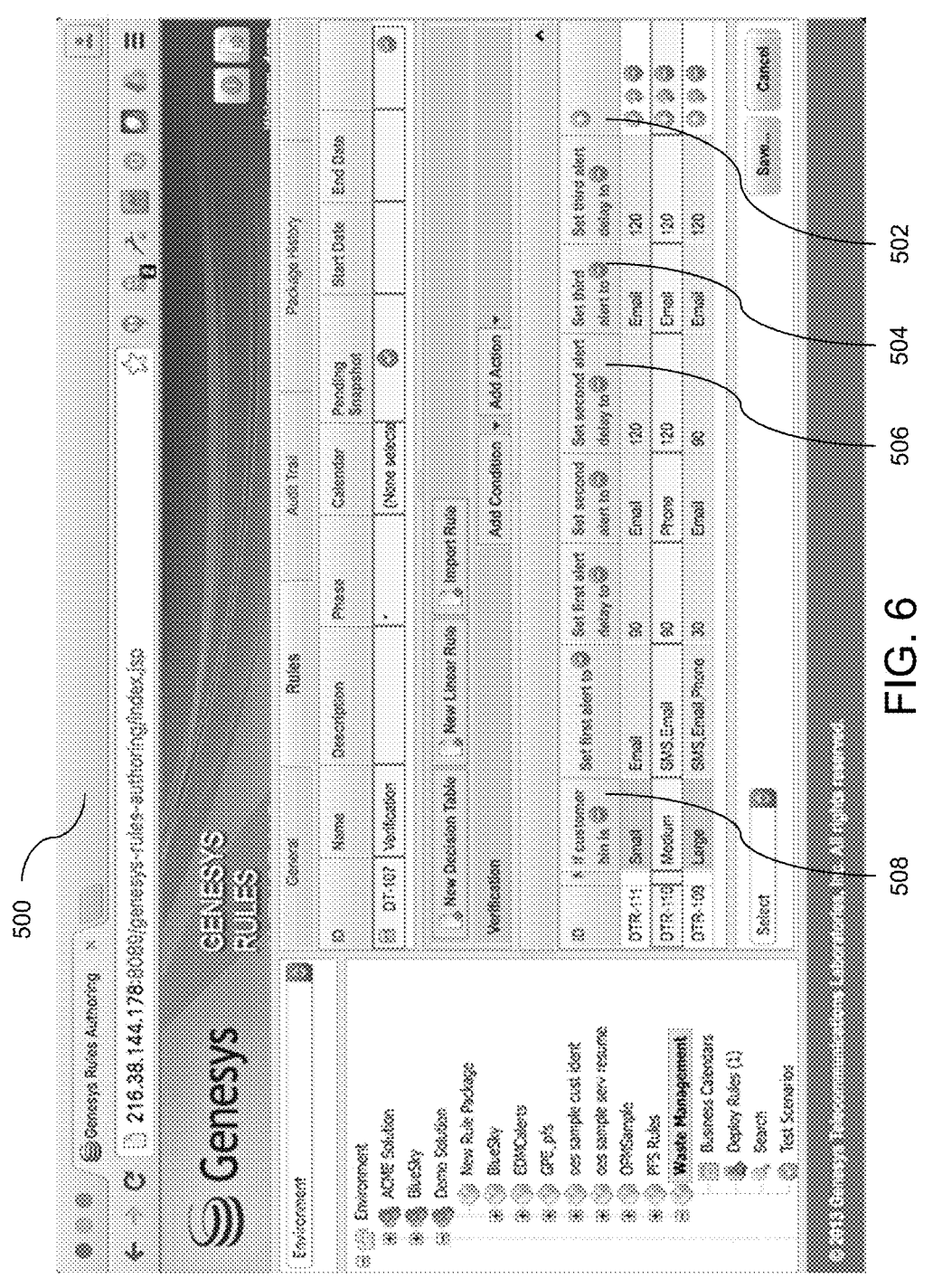

FIG. 6 is a photograph of a graphical user interface (GUI) 500 for defining the set of rules utilized by the rules engine 133, according to some embodiments of the invention.

As illustrated in FIG. 6, a user (e.g., a business analyst or the customer/recipient) may program the notification rules that define the notification strategy (which may reflect the customer's preferences). For example, the user may be able to configure as many notifications (e.g., alerts) as desired (502), may define the communication channel of each notification (504), and program a delay for each notification (506), which define the timing schedule. When a notification is sent, the passage of an amount of time equal to the associated delay may trigger the issuance of a subsequent notification, or trigger the termination of the conversation if there is no remaining subsequent notification.

The notification rules may allow for additional layers of complexity and may, for example, be determined based on any suitable parameter, such as the size of a customer's bin (508), on whether or not an issue can be resolved by the customer (e.g., whether the bin obstruction is due to the waste bin being improperly placed) or not (e.g., the obstruction being caused by street closure), and/or the like.

According to some embodiments, the rules (e.g., the timing schedule or the decision to cease further notifications, etc.) may be defined or adjusted through a machine learning algorithm that uses historical interaction data. For example, rules may employ pacing logic for timing various notifications to the recipients to ensure contact center agent availability once one or more recipients contact the contact center in response to the notifications.

Further, the rules may assign (e.g., dynamically assign) a weighted value to the acknowledgment/acceptance of each of the designated recipient, which may be based on the compliance/follow-through confidence levels associated with each recipient. Machine learning may be employed in determining confidence levels/weighted value based on historical interaction data (e.g., based on a recipients track record of following through with performance of the requested action after the recipient's acknowledgments/acceptance). In such examples, the rules may dictate not cease notifications to the recipients until an aggregate of the weighted value of the acknowledging recipient(s) is above a preset threshold.

In some examples, the rules may invoke sending communications to all recipients, all non-acknowledging recipients, or a subset (e.g., a quorum) of the recipients in the contact group informing them of an acknowledgment of a notification.

Figure 7:
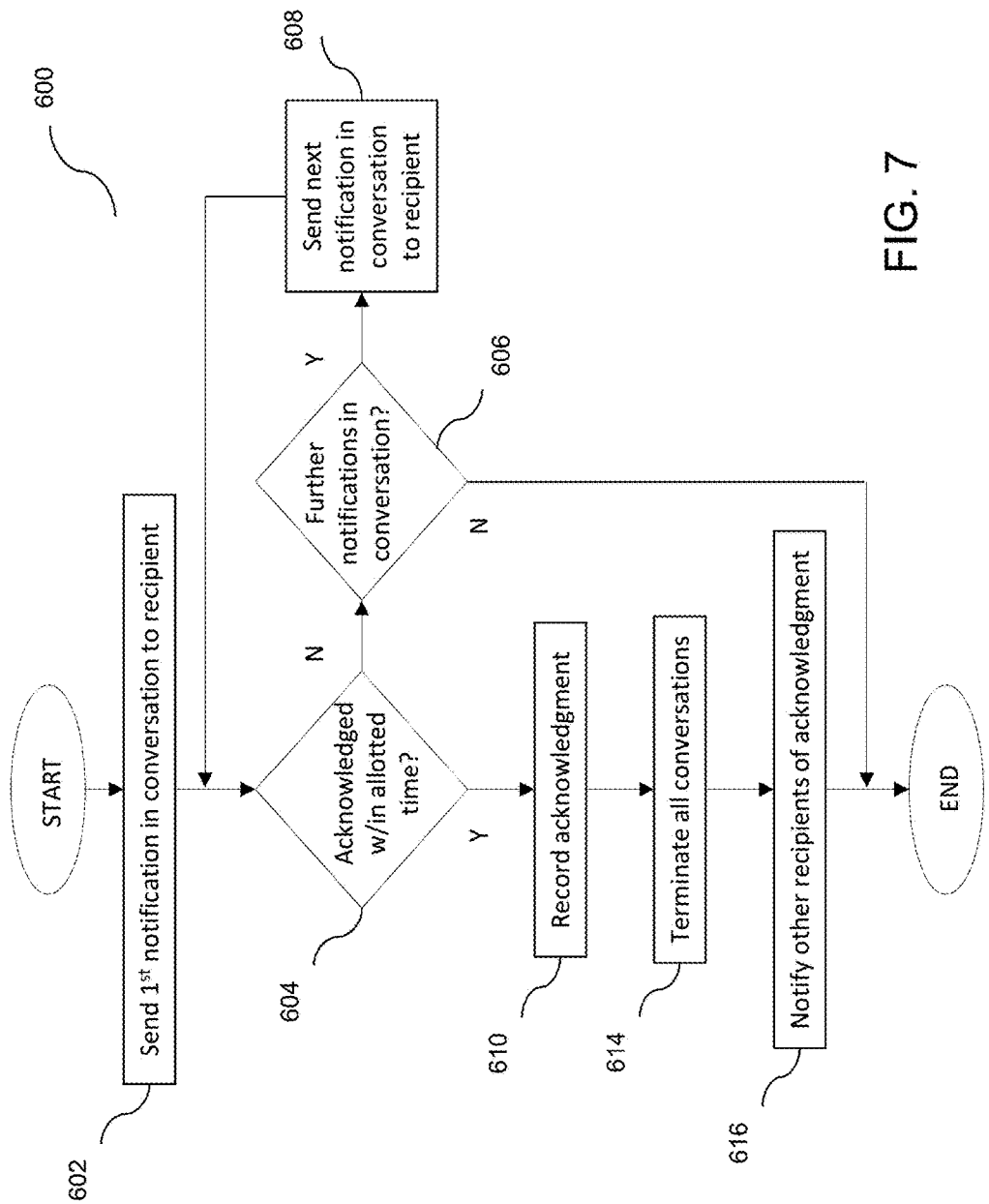
FIG. 7 is a flow diagram illustrating a process of independently managing each of a plurality of parallel and cross-dependent conversations with notification recipients, according to some exemplary embodiments of the invention.

FIG. 7 is a flow diagram of a process 600 of independently managing each of a plurality of parallel and cross-dependent conversations with notification recipients, according to some exemplary embodiments of the invention.

After receiving a notification request from a business (e.g., an external source) requesting the performance of the action by a customer (as identified by a customer ID), the orchestration system 124 may, via the conversation manager 142, generate a case for the customer with details of the request. The orchestration server 124 may further identify a plurality of recipients associated with the customer, and may identify a notification strategy associated with the customer. The notification strategy may define a plurality of conversations, which are parallel and co-dependent, with the plurality of recipients. Each of the plurality of conversations may include an ordered set of notifications separated in time (according to a timing schedule) and conducted (e.g., transmitted) across a plurality of communication channels (e.g., email, telephony channels, short message service (SMS), and/or the like) to one of the plurality of recipients.

The orchestration server 124 may then initiate a separate conversation session with one of the plurality of recipients. Each separate conversation may be identified, for example, by a conversation/session ID which is created by the conversation manager 142. The various conversations may then be correlated to the case generated by the orchestration server 124.

The conversation may start with transmission of a corresponding one of the ordered sets of notifications according to the notification strategy, as determined by the conversation manager 142. The orchestration server 124 monitors the progress of each conversation and modifies the direction of the conversations accordingly. For example, the orchestration Server 124 may modify the conversations by sending, or refraining from sending, further notifications in the other conversations based on results of the notification in a first conversation. One or more of the conversations may also be terminated based on results of the first conversation. The following provides further detail on the process for carrying out each one of these conversations.

In act 602, the orchestration server 124 directs the outbound server 146 (e.g., a cloud server) to send out the first notification in the conversation (e.g., in the ordered sets of notifications) to the appropriate recipient and using the appropriate communication channel, as determined by the notification strategy based on contact records retrieved for the customer.

In act 604, the orchestration server 124 checks whether an acknowledgment of the first notification was received during a first allotted period (as defined by the timing schedule).

If an acknowledgment/acceptance was not received, the orchestration server 124 further checks, in act 606, whether the strategy includes any further notification. If there is such a notification (i.e., a subsequent notification), in act 608, the orchestration server 124 directs the outbound server 146 to send out the subsequent notification in the conversation to the recipient using the appropriate communication channel determined by the notification strategy. The notification process 600 then reverts back to act 604, and checks whether an acknowledgment of the subsequent notification was received during a subsequent allotted period (as defined by the timing schedule).

If the orchestration server 124 determines, in act 604, that an acknowledgment/acceptance has been received from the recipient (e.g., the acknowledging recipient) indicating the performance of the action, in act 610, the orchestration server 124 records the acceptance/acknowledgment. For example, the orchestration system 124 may record an identity of the acknowledging recipient, the time of the acknowledgment, a communication channel by which the acknowledgment was made, and/or the like, in the CRM database 144 and/or the UCS 127.

In act 614, the orchestration server 124 proceeds to terminate all conversations by ceasing the transmission of any remaining notifications of the plurality of conversations.

In act 616, the orchestration server 124 initiates transmission of final communications to remaining ones of the plurality of recipients (i.e., the non-acknowledging recipient) informing them of the acknowledgment (e.g., of the performance of the action) by the acknowledging recipient.

While the process 600 described above presents the recordation of the acknowledgment (act 610), the termination of the conversations (act 614), and the transmission of the final communications (act 616) in a particular order, the present invention is not limited thereto and the aforementioned acts may be performed in any suitable order.

As described above with reference to FIGS. 1-7, the advanced outbound communication system, according to some embodiments of the present invention, allows a business (or a customer of the business) to indicate a preference as to a set of notification channels that may be used for notifications and in what order (and delay) those channels may be employed. Further, acknowledging a notification stops the set of notifications to that recipient and all other recipients, and records the acknowledgment in the system of record for future use. Furthermore, the outbound communication system allows multiple recipients to be coordinated for a given alert, as all recipients are informed that a recipient has acknowledged one of the notifications.

Accordingly, the outbound communication system results in cost savings to the alerting company due to the increased chance of a notification being acknowledged, improved resource utilization by being able to alert multiple recipients, improved customer experience and lower customer effort and frustration due to coordinated notifications. This may further result in revenue improvement due to higher sales opportunities that could be delivered through the notification features.

In some embodiments, each of the various servers, controllers, engines, and/or modules (collectively referred to as servers) in the above-described figures may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located on a computing device on-site at the contact center while others may be located on a computing device off-site, or servers providing redundant functionality may be provided both via on-site and off-site computing devices to provide greater fault tolerance. In some embodiments of the present invention, the functionality provided by servers located on computing devices off-site may be accessed and provided over a virtual private network (VPN) as if such servers were on-site, or the functionality may be provided using a software as a service (SaaS) to provide the functionality over the internet using various protocols, such as by exchanging data encoded in extensible markup language (XML) or JavaScript Object notation (JSON).

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

As used herein, the terms "use," "using," and "used" may be considered synonymous with the terms "utilize," "utilizing," and "utilized," respectively.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method for managing outbound communications for a contact center, the method comprising:
   detecting, by a processor associated with the contact center, a trigger for transmitting outbound messages to a customer of the contact center;
   determining, by the processor, a notification strategy for the customer in response to the detected trigger;
   identifying, by the processor, a contact group designated for the customer;
   initiating, by the processor, first and second conversations with respectively first and second contacts in the contact group for transmitting first and second outbound communications according to the notification strategy;
   monitoring, by the processor, progress of the first and second conversations; and
   modifying, by the processor, a state of the second conversation with the second contact based on the progress of the first conversation with the first contact, wherein the first and second outbound communications are for transmitting an alert.

2. The method of claim 1, wherein the monitoring the progress of the first and second conversations comprises monitoring for return responses to the outbound communications.

3. The method of claim 1, wherein the modifying the state of the second conversation comprises transmitting a notification to the second contact indicative of a return response from the first contact.

4. The method of claim 1, wherein the first contact and the second contact are for establishing the first and second conversations with a particular individual.

5. The method of claim 4, wherein the first conversation is over a first communication medium and the second conversation is over a second communication medium different from the first communication medium.

6. The method of claim 1, wherein the first contact and the second contact are for establishing the first and second conversations with first and second individuals.

7. A method for managing outbound communications for a customer contact center, the method comprising:
   receiving, by a processor, a notification request from an external source requesting performance of an action by a customer;
   identifying, by the processor, a plurality of recipients associated with the customer;
   identifying, by the processor, a notification strategy associated with the customer, the notification strategy defining a plurality of conversations with the plurality of recipients that are parallel and co-dependent, each of the plurality of conversations comprising an ordered set of notifications separated in time and conducted across a plurality of communication channels to one of the plurality of recipients;
   conducting, by the processor, each one of the plurality of conversations by directing, to each one of the plurality of recipients, transmission of a corresponding ordered set of notifications according to the notification strategy;

receiving, by the processor, an acknowledgment from an acknowledging recipient from among the plurality of recipients indicating the performance of the action; and in response to receiving the acknowledgment, terminating, by the processor, the plurality of conversations by ceasing remaining notifications of the plurality of conversations.

8. The method of claim 7, further comprising:
initiating, by the processor, transmission of final communications to remaining ones of the plurality of recipients indicating the performance of the action by the acknowledging recipient.

9. The method of claim 7, wherein the conducting of each one of the plurality of conversations comprises directing concurrent transmission of a first notification of the corresponding ordered set of notifications.

10. The method of claim 7, wherein the conducting of each one of the plurality of conversations comprises directing a cloud server to transmit the ordered set of notifications to each one of the plurality of recipients.

11. The method of claim 7, further comprising:
recording, by the processor, the acknowledgment by recording an identity of the acknowledging recipient, a time of acknowledgment, and a communication channel of the plurality of communication channels by which the acknowledgment was made.

12. The method of claim 7, wherein the notification strategy further defines a timing schedule for sending each one of the ordered set of notifications.

13. The method of claim 7, further comprising:
formulating the notification strategy based on notification rules and a timing schedule received from the external source.

14. The method of claim 7, wherein the plurality of communication channels comprises at least one of email, telephony channels, or short message service.

15. The method of claim 7, wherein each notification of the ordered set of notifications comprises a message requesting the performance of the action.

16. The method of claim 7, wherein the action comprises removing a blocked bin.

17. A system for managing outbound communications for a customer contact center, the system comprising:
a processor; and
memory storing instructions that, when executed on the processor, cause the processor to:
receive a notification request from an external source requesting performance of an action by a customer;
identify a plurality of recipients associated with the customer;
identify a notification strategy associated with the customer, the notification strategy defining a plurality of conversations with the plurality of recipients that are parallel and co-dependent, each of the plurality of conversations comprising an ordered set of notifications separated in time and conducted across a plurality of communication channels to one of the plurality of recipients;
conduct each one of the plurality of conversations by directing, to each one of the plurality of recipients, transmission of a corresponding ordered set of notifications according to the notification strategy;
receive an acknowledgment from an acknowledging recipient from among the plurality of recipients indicating the performance of the action; and
in response to receiving the acknowledgment, terminate the plurality of conversations by ceasing remaining notifications of the plurality of conversations.

18. The system of claim 17, wherein the memory further stores instructions that, when executed on the processor, cause the processor to:
initiate transmission of final communications to remaining ones of the plurality of recipients indicating the performance of the action by the acknowledging recipient.

19. The system of claim 17, wherein the instructions that cause the processor to conduct each one of the plurality of conversations comprises instructions that cause the processor to direct concurrent transmission of a first notification of the corresponding ordered set of notifications.

20. The system of claim 17, wherein the instructions that cause the processor to conduct each one of the plurality of conversations comprises instructions that cause the processor to direct a cloud server to transmit the ordered set of notifications to each one of the plurality of recipients.

21. The system of claim 17, wherein the memory further stores instructions that, when executed on the processor, cause the processor to:
record the acknowledgment by recording an identity of the acknowledging recipient, a time of acknowledgment, and a communication channel of the plurality of communication channels by which the acknowledgment was made.

22. The system of claim 17, wherein the notification strategy further defines a timing schedule for sending each one of the ordered set of notifications.

23. The system of claim 17, wherein the memory further stores instructions that, when executed on the processor, cause the processor to:
formulating formulate the notification strategy based on notification rules and a timing schedule received from the external source.

24. A system for managing outbound communications for a customer contact center, the system comprising:
a processor; and
a memory, wherein the processor has instructions that, when executed by the processor, cause the processor to:
detect a trigger for transmitting outbound messages to a customer of the contact center;
determine a notification strategy for the customer in response to the detected trigger;
identify a contact group designated for the customer;
initiate first and second conversations with respectively first and second contacts in the contact group for transmitting first and second outbound communications according to the notification strategy;
monitor progress of the first and second conversations; and
modify a state of the second conversation with the second contact based on the progress of the first conversation with the first contact.

* * * * *

UNITED STATES PATENT AND TRADEMARK OFFICE
CERTIFICATE OF CORRECTION

PATENT NO. : 10,264,126 B2  
APPLICATION NO. : 15/982539  
DATED : April 16, 2019  
INVENTOR(S) : Theodore Wallace Mitchell et al.

Page 1 of 1

It is certified that error appears in the above-identified patent and that said Letters Patent is hereby corrected as shown below:

In the Claims

Column 24, Line 41, Claim 23  before "formulate",  
delete "formulating"

Signed and Sealed this  
Tenth Day of March, 2020

Andrei Iancu  
*Director of the United States Patent and Trademark Office*